US012200670B2

(12) United States Patent
Bhat

(10) Patent No.: US 12,200,670 B2
(45) Date of Patent: Jan. 14, 2025

(54) BANDWIDTH PART ALLOCATION CONTROL

(71) Applicant: Telefonaktiebolaget LM Ericsson (publ), Stockholm (SE)

(72) Inventor: Harish Venkatraman Bhat, Hjärup (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 356 days.

(21) Appl. No.: 17/794,568

(22) PCT Filed: Jan. 31, 2020

(86) PCT No.: PCT/EP2020/052475
§ 371 (c)(1),
(2) Date: Jul. 21, 2022

(87) PCT Pub. No.: WO2021/151509
PCT Pub. Date: Aug. 5, 2021

(65) Prior Publication Data
US 2023/0106543 A1  Apr. 6, 2023

(51) Int. Cl.
*H04B 7/022* (2017.01)
*H04B 7/0452* (2017.01)
(Continued)

(52) U.S. Cl.
CPC ........ *H04W 72/044* (2013.01); *H04B 7/0452* (2013.01); *H04L 5/001* (2013.01);
(Continued)

(58) Field of Classification Search
CPC .... H04B 7/022; H04B 7/0413; H04B 7/0452; H04L 5/001; H04L 5/0035; H04L 5/0037;
(Continued)

(56) References Cited

U.S. PATENT DOCUMENTS

| 10,887,920 B2 * | 1/2021 | Lin | H04L 5/001 |
| 11,051,220 B1 * | 6/2021 | Song | H04W 8/245 |

(Continued)

FOREIGN PATENT DOCUMENTS

| CN | 109804662 A | 5/2019 |
| CN | 110536423 A | 12/2019 |

(Continued)

OTHER PUBLICATIONS

Lopez-Puigcerver et al., Design and optimization of Bandwidth Part selection for massive beamforming, Master's Thesis, Lund University, 66 pages, Jun. 26, 2020.*

(Continued)

*Primary Examiner* — Frank Duong
(74) *Attorney, Agent, or Firm* — Rothwell, Figg, Ernst & Manbeck, P.C.

(57) ABSTRACT

A method for controlling bandwidth part (BWP) allocation for a plurality of wireless communication devices (WCDs) is disclosed. The WCDs are organized in one or more multiple-input multiple-output (MIMO) groups, wherein each MIMO group comprises WCDs with a current BWP allocation that falls within a BWP region associated with the MIMO group. The method comprises selecting one of the plurality of WCDs as a candidate WCD for MIMO group switch, and determining a first orthogonality metric between the candidate WCD and WCDs of a candidate MIMO group, wherein the candidate WCD is not currently comprised in the candidate MIMO group. When the first orthogonality metric meets a first orthogonality criterion, the method comprises updating the BWP allocation for the candidate WCD, wherein the updated BWP allocation for the candidate WCD falls within the BWP region associated with the candidate MIMO group, and performing a MIMO group switch of the candidate WCD from its current MIMO group (Continued)

to the candidate MIMO group. Corresponding apparatus, network node and computer program product are also disclosed.

17 Claims, 7 Drawing Sheets

(51) Int. Cl.
*H04L 5/00* (2006.01)
*H04W 72/044* (2023.01)

(52) U.S. Cl.
CPC ............ *H04L 5/0037* (2013.01); *H04L 5/006* (2013.01); *H04L 5/0085* (2013.01)

(58) Field of Classification Search
CPC ................. H04L 5/006; H04L 5/0085; H04W 36/00692; H04W 72/04; H04W 72/044; H04W 72/0457; H04W 72/12; H04W 72/121; H04W 72/1263
See application file for complete search history.

(56) References Cited

U.S. PATENT DOCUMENTS

| | | |
|---|---|---|
| 2019/0313391 A1 | 10/2019 | Lin |
| 2020/0021407 A1 | 1/2020 | Abdoli et al. |
| 2020/0245304 A1* | 7/2020 | Nam ..................... H04L 5/0042 |
| 2021/0105108 A1* | 4/2021 | Abdelghaffar .......... H04L 5/001 |
| 2021/0176029 A1* | 6/2021 | Tsai ..................... H04B 7/0626 |
| 2021/0176030 A1* | 6/2021 | Tsai ..................... H04W 72/23 |
| 2023/0396684 A1* | 12/2023 | Devanagondi ...... H04L 67/5651 |

FOREIGN PATENT DOCUMENTS

| | | |
|---|---|---|
| WO | 2019/062867 A1 | 4/2019 |
| WO | 2019/095211 A1 | 5/2019 |

OTHER PUBLICATIONS

Mediatek, Bandwidth Part Adaptation, 5G Nr User Experience & Power Consumption Enhancements, White Paper, 15 pages, 2018.*
International Search Report and Written Opinion dated Oct. 6, 2020 in International Application No. PCT/EP2020/052475 (11 pages).
3GPP TS 38.211 V15.6.0, Technical Specification, 3rd Generation Partnership Project; Technical Specification Group Radio Access Network; NR; Physical channels and modulation (Release 15), Jun. 2019 (97 pages).
Qualcomm Incorporated, "Adaptation of maximum number of MIMO Layer", 3GPP TSG.RAN WG1 #98, R1-1909277, Prague, Czech Republic, Aug. 26-30, 2019 (3 pages).

* cited by examiner

BANDWIDTH PART ALLOCATION CONTROL

CROSS REFERENCE TO RELATED APPLICATIONS

This application is a 35 U.S.C. § 371 National Stage of International Patent Application No. PCT/EP2020/052475, filed Jan. 31, 2020.

TECHNICAL FIELD

The present disclosure relates generally to the field of wireless communication. More particularly, it relates to control of bandwidth part (BWP) allocation in wireless communication.

BACKGROUND

Developments in radio access technology often relate to providing increasing data rate and/or new services; typically entailing challenges at radio access transceivers of a wireless communication system (e.g., base stations and/or user equipments—UEs). For example, one challenge may be how to achieve ability to support relatively large bandwidths (e.g., 100 MHz, or more).

A possible problem with processing of relatively high bandwidths is that the power consumption associated with such processing may increase (sometimes drastically) with increased bandwidth. Other possible problems related to relatively high bandwidths include complexity and/or cost of the radio hardware. Therefore, there may be some wireless communication devices (WCDs; e.g., the UEs) that do not support the relatively high bandwidth operation which is possible to use in the wireless communication system.

The concept of bandwidth part (BWP; introduced, e.g., for third generation partnership project, 3GPP, new radio, NR) offers a possibility to support different types of WCDs—with different bandwidth capability. In NR, a BWP may be a set of—typically consecutive—physical resource blocks (PRBs), wherein the first PRB (the PRB associated with the lowest frequency interval) of the BWP may be referred to as $BWP_{start}$ and the last PRB (the PRB associated with the highest frequency interval) of the BWP may be referred to as $BWP_{end}$. The size of the BWP may be expressed as $BWP_{size} = BWP_{end} - BWP_{start}$, and the BWP may be a subset of the N PRBs of the total bandwidth or of a common resource block; $BWP_{size} \leq N$.

Another approach for providing increasing data rate and/or new services is massive beamforming, where a relatively large number of antenna elements are used at a transceiver.

Applying massive beamforming, it is possible to use multiple-input multiple-output (MIMO) to transmit two or more streams of data. For example, one WCD may be scheduled for MIMO communication in a single user (SU) MIMO approach, or two or more WCDs may be co-scheduled for MIMO communication in a multi user (MU) MIMO approach.

There is a need for approaches that enable accommodating the bandwidth part (BWP) concept in the context of multiple-input multiple-output (MIMO) communication.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

It is an object of some embodiments to solve or mitigate, alleviate, or eliminate at least some of the above or other disadvantages.

According to a first aspect, this is achieved by a method for controlling bandwidth part (BWP) allocation for a plurality of wireless communication devices (WCDs). The WCDs are organized in one or more multiple-input multiple-output (MIMO) groups, wherein each MIMO group comprises WCDs with a current BWP allocation that falls within a BWP region associated with the MIMO group.

The method comprises selecting one of the plurality of WCDs as a candidate WCD for MIMO group switch, and determining a first orthogonality metric between the candidate WCD and WCDs of a candidate MIMO group, wherein the candidate WCD is not currently comprised in the candidate MIMO group.

When the first orthogonality metric meets a first orthogonality criterion, the method comprises updating the BWP allocation for the candidate WCD, wherein the updated BWP allocation for the candidate WCD falls within the BWP region associated with the candidate MIMO group, and performing a MIMO group switch of the candidate WCD from its current MIMO group to the candidate MIMO group.

In some embodiments, updating the BWP allocation for the candidate WCD comprises keeping the current BWP allocation for the candidate WCD when it falls within the BWP region associated with the candidate MIMO group, and switching the BWP allocation for the candidate WCD when the current BWP allocation for the candidate WCD falls at least partly outside the BWP region associated with the candidate MIMO group.

In some embodiments, switching the BWP allocation for the candidate WCD comprises—when there is a BWP configured for the candidate WCD which falls within the BWP region associated with the candidate MIMO group—allocating such a BWP for the candidate WCD.

In some embodiments, switching the BWP allocation for the candidate WCD comprises—when there is no BWP configured for the candidate WCD which falls within the BWP region associated with the candidate MIMO group—performing BWP reconfiguration for the candidate WCD and allocating a reconfigured BWP which falls within the BWP region associated with the candidate MIMO group for the candidate WCD, or discarding the candidate MIMO group for inclusion of the candidate WCD.

In some embodiments, selecting one of the plurality of WCDs as the candidate WCD for MIMO group switch comprises determining a first performance metric for each MIMO group, selecting a MIMO group with first performance metric that meets a first performance criterion, and selecting a WCD of the selected MIMO group as the candidate WCD.

In some embodiments, selecting a WCD of the selected MIMO group as the candidate WCD comprises determining a second orthogonality metric for each WCD of the selected MIMO group, wherein the orthogonality metric is in relation to other WCDs of the selected MIMO group, and selecting a WCD with second orthogonality metric that meets a second orthogonality criterion as the candidate WCD.

In some embodiments, the method further comprises determining a second performance metric for each MIMO group, and selecting a MIMO group with second performance metric that meets a second performance criterion as the candidate MIMO group.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an apparatus for controlling bandwidth part (BWP) allocation for a plurality of wireless communication devices (WCDs). The WCDs are organized in one or more multiple-input multiple-output (MIMO) groups, wherein each MIMO group comprises WCDs with a current BWP allocation that falls within a BWP region associated with the MIMO group.

The apparatus comprises controlling circuitry configured to cause selection of one of the plurality of WCDs as a candidate WCD for MIMO group switch, determination of a first orthogonality metric between the candidate WCD and WCDs of a candidate MIMO group, wherein candidate WCD is not currently comprised in the candidate MIMO group, and (responsive to the first orthogonality metric meeting a first orthogonality criterion) updating of the BWP allocation for the candidate WCD, wherein the updated BWP allocation for the candidate WCD falls within the BWP region associated with the candidate MIMO group, and performance of a MIMO group switch of the candidate WCD from its current MIMO group to the candidate MIMO group.

A fourth aspect is a network node comprising the apparatus of the third aspect.

In some embodiments, the network node is a base station, a transceiver node, a central network node, or a cloud server node.

In some embodiments, any of the above aspects may additionally have features identical with or corresponding to any of the various features as explained above for any of the other aspects.

An advantage of some embodiments is that approaches are provided that enable accommodating the bandwidth part (BWP) concept in the context of multiple-input multiple-output (MIMO) communication.

An advantage of some embodiments is that one or more performance metrics (e.g., capacity related metrics, channel capacity, bitrate, throughput, block error rate (BLER), signal-to-interference ratio (SIR), number of layers, or the like) may be improved compared to prior art approaches.

An advantage of some embodiments is that cell capacity may be improved (e.g., increased).

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

Generally, when a wireless communication device (WCD) is referred to herein, it may comprise any suitable communication device (e.g., a user equipment—UE, a station—STA, or similar).

Also generally, when reference is made to bandwidth part (BWP) allocation for one or more wireless communication device (WCD), that expression may be interpreted to encompass BWP allocation to the one or more WCD and/or BWP allocation of the one or more WCD.

In the following, embodiments will be described where approaches are provided that enable accommodating the bandwidth part (BWP) concept in the context of multiple-input multiple-output (MIMO) communication.

Even if the approaches are exemplified in the context of scheduling of downlink (DL) transmissions, application is not limited thereto. Contrarily, some embodiments, may be equally applicable for scheduling of uplink (UL) transmissions and/or scheduling of peer-to-peer transmissions.

Figure 1:
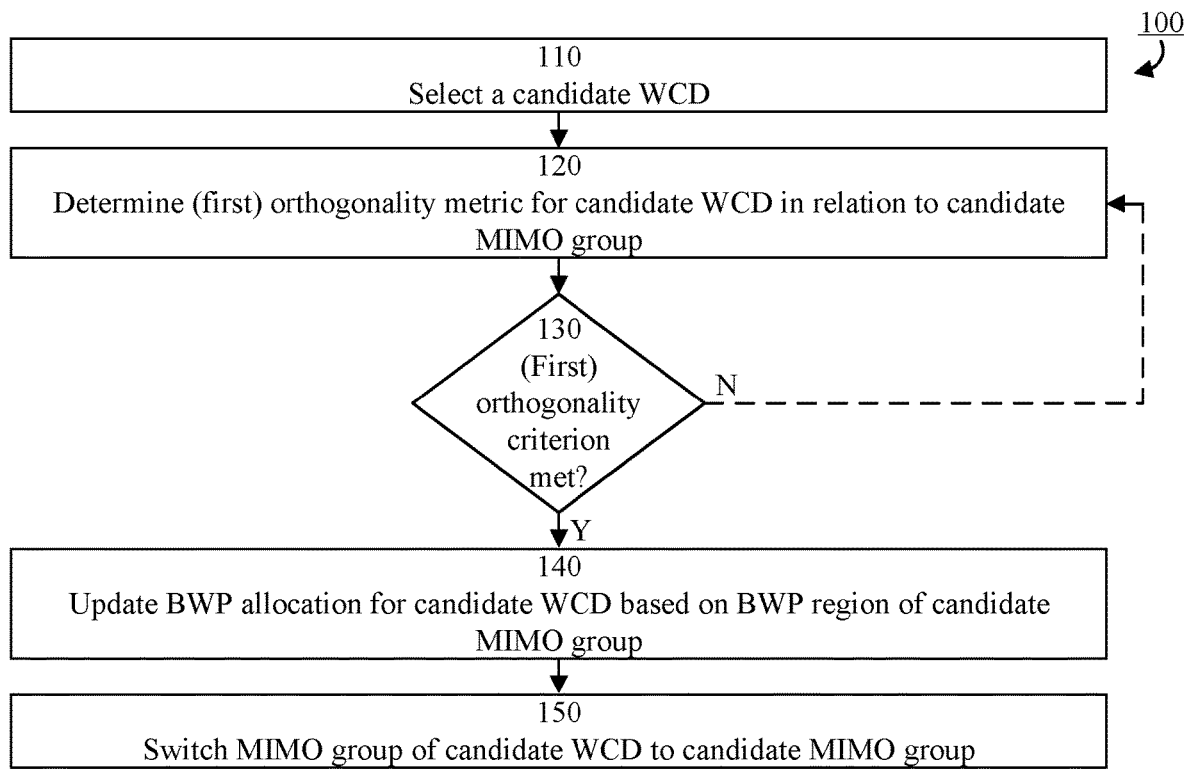
FIG. 1 is a flowchart illustrating example method steps according to some embodiments.

FIG. 1 illustrates an example method 100 according to some embodiments. The method may, for example, be performed by a network node (e.g., a base station, a transceiver node, a central network node, or a cloud server node) or any other suitable wireless communication apparatus.

The method 100 is for controlling bandwidth part (BWP) allocation for a plurality of wireless communication devices (WCDs).

The WCDs are organized in one or more (e.g., a plurality of) multiple-input multiple-output (MIMO) groups, wherein each MIMO group comprises WCDs with a current BWP allocation that falls within a BWP region associated with the MIMO group.

In some embodiments, the method 100 may comprise a step (not shown) of organizing the WCDs into the one or more MIMO groups.

In some embodiments, each MIMO group comprises only WCDs with a current BWP allocation that falls within the BWP region associated with the MIMO group.

Generally, there may be one or more MIMO groups associated with the same BWP region.

Also generally, a MIMO group may be a MU-MIMO group comprising two or more WCDs, or a SU-MIMO group comprising a single WCD.

In some embodiments, each WCD belongs to only one MIMO group at each moment in time. In other embodiments, a WCD may belong to one or more (e.g., two, three, or four) MIMO groups at each moment in time. For example, a WCD with an allocated BWP within a specific BWP region may simultaneously belong to two or more MIMO groups associated with the specific BWP region.

In some embodiments, one objective of organizing WCDs into MIMO groups is that WCDs belonging to the same group fulfill an orthogonality criterion. This is because MIMO transmission is generally more efficient the higher the orthogonality is between the different MIMO streams.

Any suitable orthogonality metric may be used to determine whether the orthogonality criterion is fulfilled. The orthogonality may be determined in terms of spatial separation and/or signal separation.

For example, the orthogonality metric may be (or may be based on) a difference between angle of arrival (AoA) of MIMO stream carrying signals and/or an orthogonality factor (OF) between MIMO stream carrying signals.

For example, the orthogonality factor between two MIMO stream carrying signals may be determined as a correlation between the baseband representations of the MIMO stream carrying signals.

AoA is suitable for both time division duplex (TDD) and frequency division duplex (FDD), and correlation between the baseband representations is suitable at least for TDD.

The orthogonality criterion may, for example, be determined as fulfilled when the orthogonality metric falls on a specified side of an orthogonality threshold.

For example, if an orthogonality factor (OF) between 0 and 1 is used as orthogonality metric and OF=1 corresponds to full orthogonality, the orthogonality criterion may be determined as fulfilled when the orthogonality metric falls above a threshold value set between 0 and 1.

For example, if an absolute value of AoA difference between 0 and $\pi/2$ is used as orthogonality metric, the orthogonality criterion may be determined as fulfilled when the orthogonality metric falls above a threshold value set between 0 and $\pi/2$.

In step 110, one of the plurality of WCDs is selected as a candidate WCD for MIMO group switch. The selection may be performed in any suitable way. For example, the candidate WCD may be selected at random.

In some embodiments, more than one of the plurality of WCDs are selected as candidate WCDs for MIMO group switch. In such embodiments, parallel processing of the candidate WCDs may be applied (e.g., for one or more of steps 120-150) to determine whether and, if so, how MIMO group switch should be performed for each of the candidate WCDs.

In some embodiments, a WCD that performs poorly according to some performance metric may be selected as the candidate WCD. In some embodiments, the WCD that performs worst among the WCDs according to some performance metric may be selected as the candidate WCD. In some embodiments, the WCD that performs worst among the WCDs of the worst performing MIMO group according to some performance metric may be selected as the candidate WCD.

Any suitable performance metric may be used. Examples include capacity related metrics; e.g., channel capacity, bitrate, throughput, block error rate (BLER), signal-to-interference ratio (SIR), number of layers, etc.

In some embodiments, step 110 comprises determining a (first) performance metric for each MIMO group, selecting a MIMO group with (first) performance metric that meets a (first) performance criterion and selecting a WCD of the selected MIMO group as the candidate WCD.

Generally, the performance metric for a MIMO group may, for example, be determined as a combined (e.g., average, accumulated, or similar) performance metric for all of the WCDs in the MIMO group.

Meeting the (first) performance criterion may, for example, comprise having the worst (e.g., lowest capacity, etc.) value of the (first) performance metric among the MIMO groups. Alternatively or additionally, meeting the (first) performance criterion may comprise having a value of the (first) performance metric that falls on a specified side of (e.g., below) a (first) performance metric threshold.

In some embodiments, more than one MIMO group is selected in quest of one or more candidate WCDs. In such embodiments, parallel processing of the selected MIMO groups may be applied to select the candidate WCD(s).

In some embodiments, selecting a WCD of the selected MIMO group as the candidate WCD comprises determining a (second) orthogonality metric for each WCD of the selected MIMO group (wherein the orthogonality metric is in relation to other WCDs of the selected MIMO group), and selecting a WCD with (second) orthogonality metric that meets a (second) orthogonality criterion as the candidate WCD.

Generally, the orthogonality metric of a WCD in relation to WCDs of a MIMO group may, for example, be determined as a combined (e.g., average, accumulated, or similar) pairwise orthogonality metric between the WCD and all (other) WCDs in the MIMO group.

Meeting the (second) orthogonality criterion may, for example, comprise having the worst value of the (second) orthogonality metric among the WCDs of the selected MIMO group. Alternatively or additionally, meeting the (second) orthogonality criterion may comprise having a value of the (second) orthogonality metric that falls on a specified side of (e.g., below) a (second) orthogonality metric threshold.

In step 120, a (first) orthogonality metric between the candidate WCD and WCDs of a candidate MIMO group is determined. Generally, the candidate MIMO group does not currently comprise the candidate WCD.

The (first) orthogonality metric of step 120 may, for example, be determined in the same way as the (second) orthogonality metric of step 110; but in relation to the candidate MIMO group instead of the selected MIMO group of step 110.

In some embodiments, the method 100 may comprise a step (not shown) of selecting the candidate MIMO group; e.g., before, or during, execution of step 120.

For example, a (second) performance metric may be determined for each MIMO group, and a MIMO group with (second) performance metric that meets a (second) performance criterion may be selected as the candidate MIMO group.

The (second) performance metric may, for example, coincide with—or be determined in the same way as—the (first) performance metric of step 110.

Meeting the (second) performance criterion may, for example, comprise having the best (e.g., highest capacity, etc.) value of the (second) performance metric among the MIMO groups. Alternatively or additionally, meeting the (second) performance criterion may comprise having a value of the (second) performance metric that falls on a specified side of (e.g., above) a (second) performance metric threshold.

In some embodiments, more than one MIMO group is selected as candidate MIMO group in quest of a suitable MIMO group for inclusion of the candidate WCD. In such embodiments, parallel processing of the candidate MIMO groups may be applied (e.g., for one or more of steps 120-150) to determine whether and, if so, which candidate MIMO group the candidate WCD should be included in.

In step 130, it is determined whether the (first) orthogonality metric meets a (first) orthogonality criterion.

Meeting the (first) orthogonality criterion may, for example, comprise having the best value of the (first) orthogonality metric among several candidate MIMO groups. Alternatively or additionally, meeting the (first) orthogonality criterion may comprise having a value of the (first) orthogonality metric that falls on a specified side of (e.g., above) a (first) orthogonality metric threshold.

When the (first) orthogonality metric does not meet the (first) orthogonality criterion (N-path out of step 130), one or more of the following actions may be pursued: iterating step 130 (and possibly step 120—as illustrated in FIG. 1—and/or the step of selecting candidate MIMO group) for another candidate MIMO group, keeping the candidate WCD in its current MIMO group, creating a new MIMO group (typically a SU-MIMO group) comprising the candidate WCD, iterating step 130 (and possibly step 110 and/or 120 and/or the step of selecting candidate MIMO group) for another candidate WCD, and redefining one or more of the (first and/or second) performance criterion and the (first and/or second) orthogonality criterion.

When the (first) orthogonality metric meets the (first) orthogonality criterion (Y-path out of step 130), the method proceeds to step 140.

In step 140, the BWP allocation is updated for the candidate WCD, wherein (e.g., so that) the updated BWP allocation for the candidate WCD falls within the BWP region associated with the candidate MIMO group, and in step 150, a MIMO group switch is performed of the candidate WCD from its current MIMO group to the candidate MIMO group.

In some embodiments, updating the BWP allocation for the candidate WCD comprises keeping the current BWP allocation for the candidate WCD when it falls within the BWP region associated with the candidate MIMO group.

In some embodiments, updating the BWP allocation for the candidate WCD comprises switching the BWP allocation for the candidate WCD when the current BWP allocation for the candidate WCD falls fully or partly outside the BWP region associated with the candidate MIMO group.

Switching the BWP allocation for the candidate WCD may comprise, allocating a BWP already configured for the candidate WCD, when there is such a BWP which falls within the BWP region associated with the candidate MIMO group.

When there is no BWP configured for the candidate WCD which falls within the BWP region associated with the candidate MIMO group, switching the BWP allocation for the candidate WCD may comprise performing BWP reconfiguration for the candidate WCD, and allocating a reconfigured BWP which falls within the BWP region associated with the candidate MIMO group.

Alternatively, switching the BWP allocation for the candidate WCD may comprise discarding the candidate MIMO group for inclusion of the candidate WCD when there is no BWP configured for the candidate WCD which falls within the BWP region associated with the candidate MIMO group. Then, the method may comprise pursuing one or more of the following actions: iterating step 130 (and possibly step 120 and/or the step of selecting candidate MIMO group) for another candidate MIMO group, keeping the candidate WCD in its current MIMO group, creating a new MIMO group (typically a SU-MIMO group) comprising the candidate WCD, iterating step 130 (and possibly step 110 and/or 120 and/or the step of selecting candidate MIMO group) for another candidate WCD, and redefining one or more of the (first and/or second) performance criterion and the (first and/or second) orthogonality criterion.

In some embodiments, the method 100 may comprise a step (not shown) scheduling and/or transmitting in accordance with the allocated BWP(s) and the MIMO group organization.

Generally, execution of one or more steps of the method 100 may be triggered in any suitable way. For example, the method 100 may be performed at static or dynamic time intervals. Alternatively or additionally, the method may be performed when a (third) performance metric fulfills a (third) performance criterion; e.g., when an overall channel capacity falls below an overall channel capacity threshold value, and/or when one or more WCD channel capacities fall below a WCD channel capacity threshold value.

Figure 2:
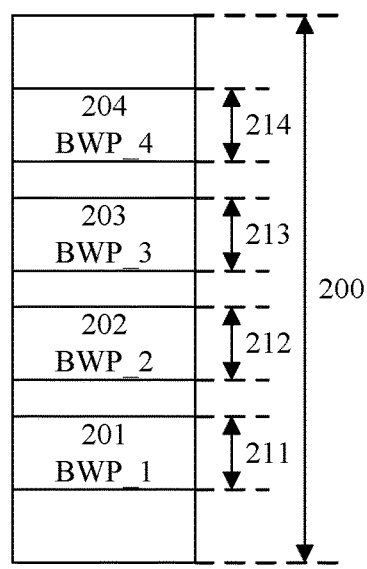
FIG. 2 is a schematic drawing illustrating an example BWP configuration according to some embodiments.

FIG. 2 schematically illustrates an example BWP configuration according to some embodiments, wherein frequency extends in a vertical direction.

In FIG. 2, a context of a total available bandwidth 200 is illustrated, wherein a WCD is configured with four BWPs 201, 202, 203, 204 (BWP_1, BWP_2, BWP_3, BWP_4), each extending over a respective frequency interval 211, 212, 213, 214. The frequency intervals 211, 212, 213, 214 are non-overlapping and each frequency interval is comprised within the total available bandwidth 200.

Generally, a WCD may be configured with one or more (e.g., one, two, three, four, five, etc.) BWPs, each extending over a respective frequency interval. The respective frequency intervals may be non-overlapping or (partly or fully) overlapping.

When a WCD is configured with at least one BWP, one or more (typically one) of the at least one configured BWPs may be allocated for the WCD; e.g., for downlink and/or uplink communication. Thus, (re)configuration of a BWP for a WCD may be interpreted as making that BWP available for activation in relation to the WCD, and allocation of a (configured) BWP for a WCD may be interpreted as the activating that BWP for communication in relation to the WCD.

In some embodiments, an $i^{th}$ BWP may be defined as a set of $K_i$ contiguous physical resource blocks (PRBs), wherein the first (lowest frequency) PRB of the BWP may be referred to as $BWP_{start}$ and the last (highest frequency) PRB of the BWP may be referred to as $BWP_{end}$. Then, the size of the BWP expressed in number $K_i$ of PRBs is $BWP_{size}=BWP_{end}-BWP_{start}$ (compare with the respective frequency intervals of FIG. 2). The BWP may be seen as a subset of the total bandwidth (compare with 200 of FIG. 2), wherein the total bandwidth corresponds to N PRBs, i.e., $BWP_{size} \leq N$.

In some embodiments, some example configuration parameters for the BWP are that up to four BWPs can be configured for a UE in the downlink (DL) and up to four BWPs can be configured for a UE in the downlink (UL), while only one of the configured BWPs can be active (allocated) in UL and only one of the configured BWPs can be active (allocated) in DL.

Typically, a UE will not receive or transmit data outside the allocated BWP(s), and other signaling (e.g., sounding reference signals—SRS) will not be sent outside the allocated BWP.

In some embodiments, BWP (re)configuration for a UE may be performed using radio resource control (RRC) configurations and/or a change of BWP allocation can be indicated to a UE using downlink control information (DCI) in the physical downlink control channel (PDCCH).

To further exemplify the concept of BWP, reference is made to 3GPP technical specification (TS) 38.211, Physical Channel and Modulation, chapter 4.4.5.

Figure 3:
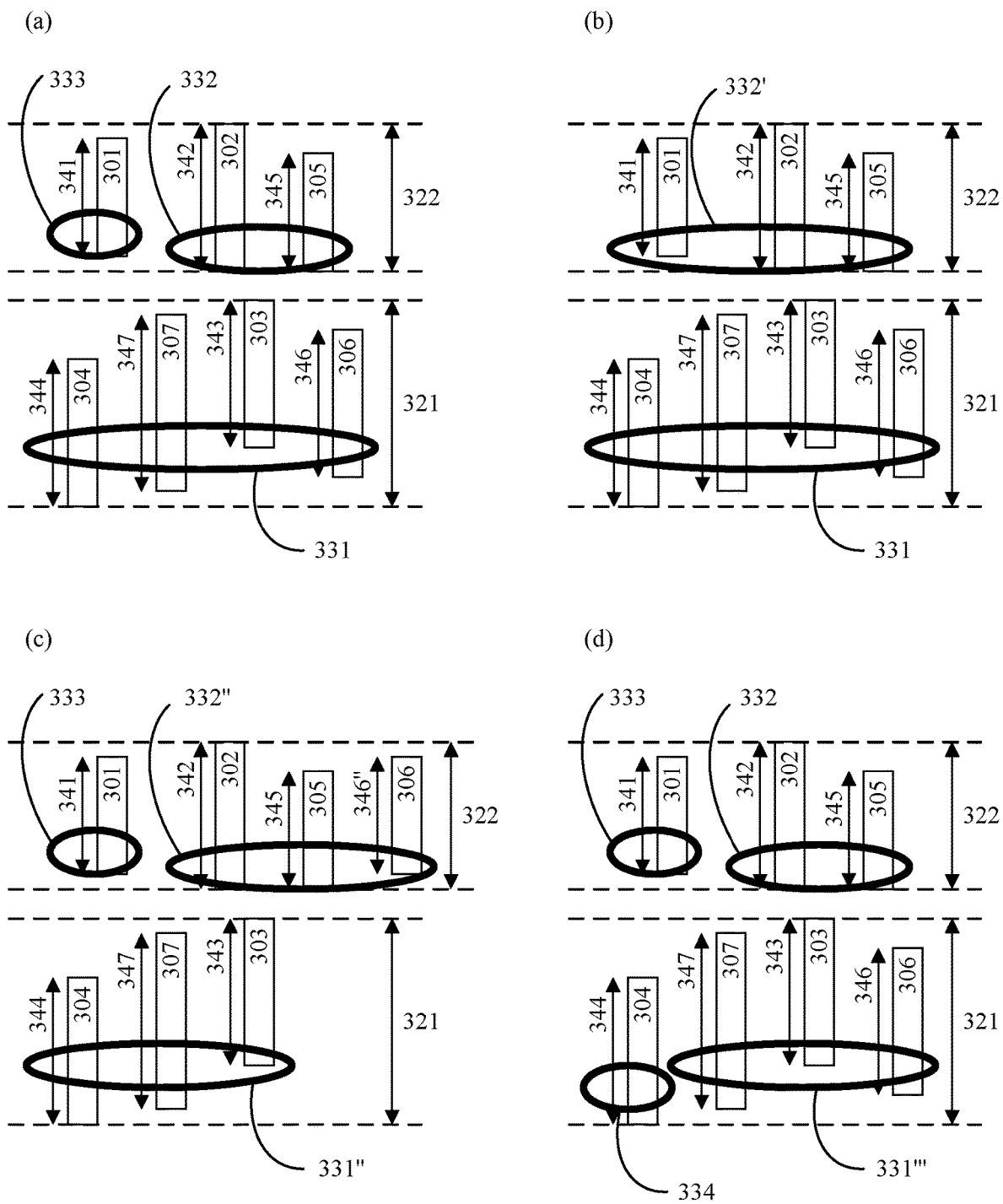
FIG. 3 is a schematic drawing illustrating some example BWP allocations and MIMO groups according to some embodiments.

FIG. 3 schematically illustrates some examples of BWP allocations and MIMO groups in relation to BWP regions according to some embodiments, wherein frequency extends in a vertical direction. FIG. 3 illustrates two BWP regions 321, 322. However, any suitable number of BWP regions may be applicable in various embodiments.

Generally, a BWP region is an extension in frequency (e.g., expressed in Hz, PRBs, or similar) which comprises at least one possible BWP. For example, a the extension of a BWP region may coincide with the frequency interval of a BWP, or the extension of a BWP region may be larger than the frequency interval of a BWP.

Part (a) illustrates an initial organization of seven WCDs—represented as 301, 302, 303, 304, 305, 306, 307 and having respective currently allocated BWPs 341, 342, 343, 344, 345, 346, 347—in three MIMO groups 331, 332, 333. Each of the MIMO groups 331, 332, 333 comprises WCDs with a current BWP allocation that falls within a BWP region 321, 322 associated with the MIMO group; the MIMO group 331 is associated with the BWP region 321 and comprises the WCDs 303, 304, 306, 307 that have respective currently allocated BWPs 343, 344, 346, 347 that falls within the BWP region 321, the MIMO group 332 is associated with the BWP region 322 and comprises the WCDs 302, 305 that have respective currently allocated BWPs 342, 345 that falls within the BWP region 322, and the MIMO group 333 is associated with the BWP region 322 and comprises the WCD 301 that have respective currently allocated BWP 341 that falls within the BWP region 322.

Part (b) illustrates a first alternative organization, e.g., subsequent to the organization illustrated by (a), of the seven WCDs 301, 302, 303, 304, 305, 306, 307 in two MIMO groups 331, 332'. A possible scenario leading from (a) to (b) is that WCD 301 is selected as a candidate WCD for MIMO group switch (compare with step 110 of FIG. 1) and that the (first) orthogonality metric of WCD 301 in relation to the candidate MIMO group 332 meets the (first) orthogonality criterion (compare with steps 120 and 130 of FIG. 1). Since the BWP 341 of the candidate WCD 301 falls within the BWP region 322 associated with the candidate MIMO group 332, updating of the BWP allocation for the candidate WCD 301 comprises keeping the current BWP allocation 341 for the candidate WCD 301 (compare with step 140 of FIG. 1), and the candidate WCD 301 is simply switched from MIMO group 333 to the candidate MIMO group 332 (compare with step 150 of FIG. 1) which is accordingly denoted as 332' thereafter. Since the MIMO group 333 was a SU-MIMO group, it vanishes when the WCD 301 is removed from it.

Part (c) illustrates a second alternative organization, e.g., subsequent to the organization illustrated by (a), of the seven WCDs 301, 302, 303, 304, 305, 306, 307 in three MIMO groups 331", 332", 333. A possible scenario leading from (a) to (c) is that WCD 306 is selected as a candidate WCD for MIMO group switch (compare with step 110 of FIG. 1) and that the (first) orthogonality metric of WCD 306 in relation to the candidate MIMO group 332 meets the (first) orthogonality criterion (compare with steps 120 and 130 of FIG. 1). Since the BWP 346 of the candidate WCD 306 does not fall within the BWP region 322 associated with the candidate MIMO group 332, updating of the BWP allocation for the candidate WCD 306 comprises switching the BWP allocation from 346 to 346" for the candidate WCD 306; possibly after BWP reconfiguration (compare with step 140 of FIG. 1). Then, the candidate WCD 306 is switched from MIMO group 331 to the candidate MIMO group 332 (compare with step 150 of FIG. 1), which are accordingly denoted as 331" and 332" thereafter.

Part (d) illustrates a third alternative organization, e.g., subsequent to the organization illustrated by (a), of the seven WCDs 301, 302, 303, 304, 305, 306, 307 in four MIMO groups 331''', 332, 333, 334. A possible scenario leading from (a) to (d) is that WCD 304 is selected as a candidate WCD for MIMO group switch (compare with step 110 of FIG. 1) and that the (first) orthogonality metric of WCD 304 does not meet the (first) orthogonality criterion in relation to any candidate MIMO group 332, 333 (compare with steps 120 and 130 of FIG. 1). Therefore, a new MIMO group 334 is created for the candidate WCD 304 and its old MIMO group is accordingly denoted as 331''' thereafter. Keeping the current BWP allocation 344 for the candidate WCD 304, the new MIMO group 334 becomes associated with the BWP region 321.

Figure 4:
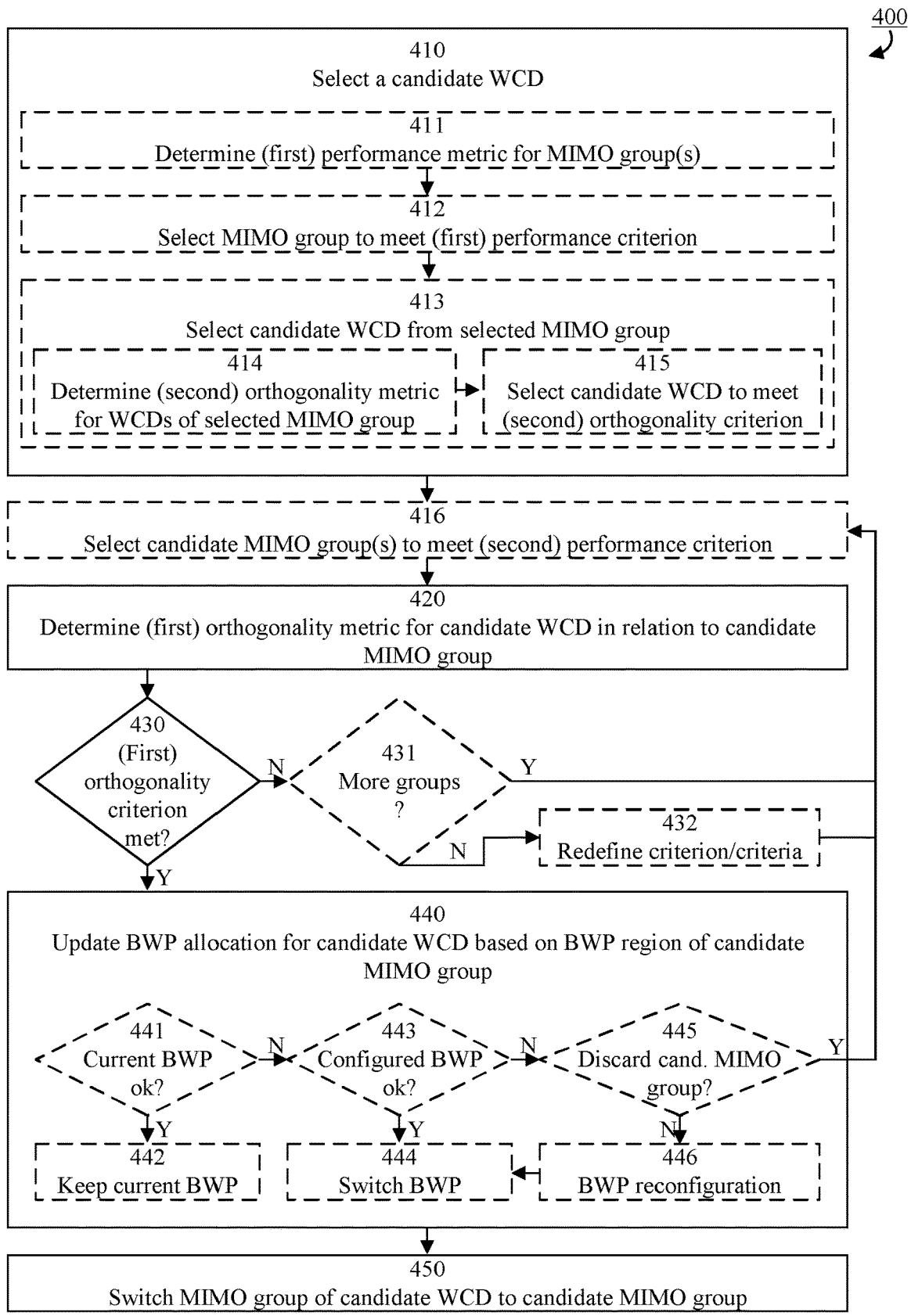
FIG. 4 is a flowchart illustrating example method steps according to some embodiments.

FIG. 4 illustrates an example method 400 according to some embodiments. The method may, for example, be performed by a network node (e.g., a base station, a transceiver node, a central network node, or a cloud server node) or any other suitable wireless communication apparatus.

The method 100 is for controlling bandwidth part (BWP) allocation for a plurality of wireless communication devices (WCDs).

The WCDs are organized in one or more (e.g., a plurality of) multiple-input multiple-output (MIMO) groups, wherein each MIMO group comprises WCDs with a current BWP allocation that falls within a BWP region associated with the MIMO group.

The method 400 may be seen as an example of the method 100 of FIG. 1 (step 410 may be seen as an example of step 110, step 420 may be seen as an example of step 120, step 430 may be seen as an example of step 130, step 440 may be seen as an example of step 140, and step 450 may be seen as an example of step 150). Thus, features described in connection with FIG. 1 may be equally applicable to the context of FIG. 4, and vice versa.

In step 410, one of the plurality of WCDs is selected as a candidate WCD for MIMO group switch.

In optional sub-step 411, a (first) performance metric is determined for each MIMO group, and in optional sub-step 412, a MIMO group is selected with (first) performance metric that meets a (first) performance criterion.

In optional sub-step 413, a WCD of the selected MIMO group is selected as the candidate WCD. In optional sub-sub-step 414, a (second) orthogonality metric is determined for each WCD of the selected MIMO group, and in optional sub-sub-step 415, a WCD with (second) orthogonality metric that meets a (second) orthogonality criterion is selected as the candidate WCD.

In optional step 416 a candidate MIMO group with (second) performance metric that meets a (second) performance criterion is selected, which does not currently comprise the candidate WCD. For example, the (second) performance metric of 416 may be the (first) performance metric of 412.

In step 420, a (first) orthogonality metric between the candidate WCD and WCDs of the candidate MIMO group is determined. The (first) orthogonality metric of 420 may, for example, be determined in the same way as the (second) orthogonality metric of 414; but in relation to the candidate MIMO group.

In step 430, it is determined whether the (first) orthogonality metric meets a (first) orthogonality criterion.

When the (first) orthogonality metric does not meet the (first) orthogonality criterion (N-path out of step 430), it may be determined in optional step 431 whether there are more MIMO groups that should be considered as candidate MIMO groups. If so (Y-path out of step 431), the method may loop back to 416 (or 420; not shown). If not (N-path out of step 431), one or more of the (first and/or second) performance criterion and the (first and/or second) orthogonality criterion may be redefined as illustrated by optional step 432, and the method may loop back to 416 (or 410, or 420; not shown). Other possible actions to pursue following the N-path out of step 431 include: keeping the candidate WCD in its current MIMO group, or creating a new MIMO group comprising the candidate WCD.

When the (first) orthogonality metric meets the (first) orthogonality criterion (Y-path out of step 430), the method proceeds to step 440.

In step 440, the BWP allocation is updated for the candidate WCD, wherein (e.g., so that) the updated BWP allocation for the candidate WCD falls within the BWP region associated with the candidate MIMO group.

In optional sub-step 441, it is determined whether the current BWP allocation for the candidate WCD falls within the BWP region associated with the candidate MIMO group. If so (Y-path out of 441), the current BWP allocation is kept for the candidate WCD as illustrated by optional sub-step 442. If not (N-path out of 441), the process proceeds to 443.

In optional sub-step 443, it is determined whether there is already configured a BWP for the candidate WCD which falls within the BWP region associated with the candidate MIMO group. If so (Y-path out of 443), such a BWP is allocated for the candidate WCD in a BWP switch as illustrated by optional sub-step 444. If not (N-path out of 443), the process proceeds to 445.

In optional sub-step 445, it is determined whether there to discard the candidate MIMO group for inclusion of the candidate WCD. If so (Y-path out of 445), the method loops back to 416 (or 420, or 431; not shown) for processing of another candidate MIMO group. If not (N-path out of 445), the process proceeds to optional sub-step 446, where a BWP reconfiguration is performed so that a reconfigured BWP for the candidate WCD falls within the BWP region associated with the candidate MIMO group. Then, in 444, such a BWP is allocated for the candidate WCD in a BWP switch.

In step 450, a MIMO group switch is performed of the candidate WCD from its current MIMO group to the candidate MIMO group.

An example execution of the method 400 will now be described in the context of a BWP region scenario where UEs with overlapping BWP allocation are organized into the same BWP region. The formation of MIMO group(s) for each BWP region may comprise checking orthogonality (e.g., spatial) properties for all the UEs within the BWP region; e.g., calculating an orthogonality factor (OF) for all possible pairs of UEs, determining UEs to be sufficiently orthogonal if the calculated OF is greater than a pre-defined threshold value, and sorting sufficiently orthogonal UEs into the same MIMO group.

To select a candidate WCD (compare with 410) in this example, an average channel capacity (CC) is first calculated for each of the MIMO groups (compare with 411; $CC_m$ being the (first) performance metric);

$$CC_m = \frac{1}{L}\sum_{l=0}^{L} CC_{m,l}$$

wherein m is a MIMO group index, and $CC_{m,l}$ is the CC of layer l of MIMO group m, which is determined as $CC_{m,l}=BW \log_2(1+SINR_{m,l})$ where BW denotes the system bandwidth and $SINR_{m,l}$ denotes the signal-to-interference-and-noise ration of layer l of MIMO group m. For ease of notation, it is assumed that all UEs are single-layered UEs in the following.

In some embodiments, the MIMO groups may be sorted in order of channel capacity. In any case, the MIMO group which has the lowest channel capacity may be selected (compare with 412; lowest channel capacity being the first performance criterion).

Typically, the selected MIMO group comprises a UE (the candidate WCD) for which the current MIMO group and/or the currently allocated BWP may not be suitable; e.g., in terms of system throughput, UE throughput, or similar.

To find that UE within the selected group an orthogonality factor (OF) is determined for each UE in the selected group (compare with 414; $OF_{k,avg}$ being the (second) orthogonality metric):

$$OF_{k,avg} = \frac{1}{P}\sum_{p \neq k} OF_{k,p}$$

wherein k is a UE index, $OF_{k,p}$ is the OP between UEs k and p, and P is the number of UEs in the selected MIMO group.

In some embodiments, the UEs of the selected group may be sorted in order of orthogonality factor. In any case, the UE which has the lowest orthogonality factor may be selected (compare with 415; lowest orthogonality factor being the second orthogonality criterion) as candidate WCD.

To determine which MIMO group the candidate WCD should be switched to (compare with 416, 420, 430), an iterative approach is applied in this example.

Starting with selecting the MIMO group which has the highest channel capacity as candidate MIMO group (compare with 416; highest channel capacity being the second performance criterion), an orthogonality metric is determined for the candidate UE in relation to the candidate MIMO group (compare with 420; (first) orthogonality metric). The orthogonality metric may be determined as the orthogonality factor above or in terms of AoA. Then, the orthogonality metric is compared with a threshold value in this example, and if the threshold value is exceeded it is determined that the candidate WCD should be included in the candidate MIMO group (compare with 430; exceeding the threshold value being meeting the (first) orthogonality criterion). If the threshold value is not exceeded, the process is iterated by selecting the MIMO group which has the next highest channel capacity as candidate MIMO group; and so on until a suitable MIMO group is found or no more groups are to be selected as candidate MIMO group.

When it is determined that the candidate WCD should be included in the candidate MIMO group (compare with Y-path out of 430, and with 440), a target BWP region $BWP_{region\_target}$ may be selected as the BWP region of the candidate MIMO group, and a BWP that lies within the target BWP region is allocated for the candidate WCD: $BWP_{start} \geq BWP_{region\_target,start}$ and $BWP_{end} \leq BWP_{region\_target,end}$. The allocated BWP may be the same BWP as previously allocated, or another BWP than previously allocated. The candidate WCD may be informed of the BWP allocation using downlink control information (DCI) in the physical downlink control channel (PDCCH).

If none of the BWP configured for the candidate WCD lies within $BWP_{region\_target}$ the UE may need to be reconfigured before BWP allocation; e.g., using RRC reconfiguration to inform the UE of a new BWP configuration. Alternatively, the candidate MIMO group may be discarded for inclusion of the candidate WCD, and the process is iterated by selecting the next MIMO group in order of channel capacity as candidate MIMO group; and so on until a suitable MIMO group is found or no more groups are to be selected as candidate MIMO group.

Figure 5:
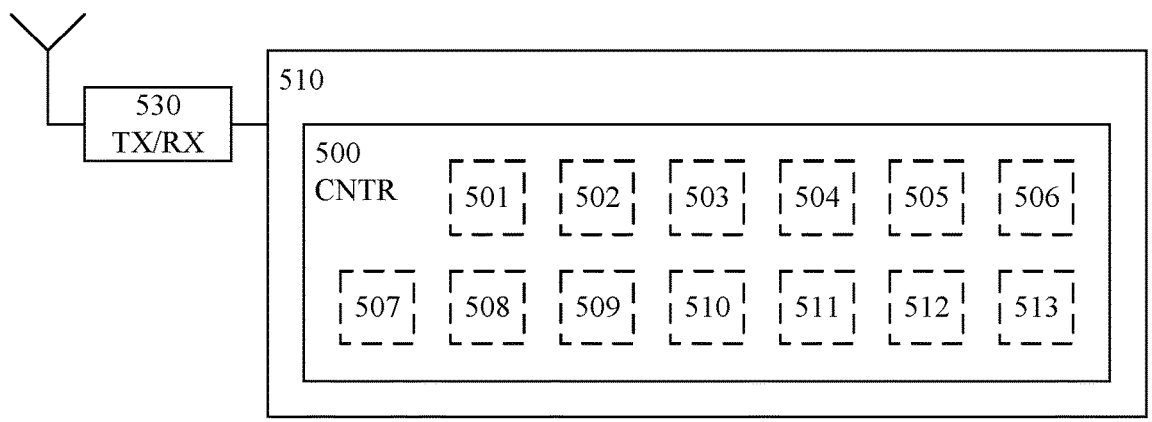
FIG. 5 is a schematic block diagram illustrating an example apparatus according to some embodiments.

FIG. 5 schematically illustrates an example apparatus 510 according to some embodiments. For example, the apparatus may be comprised (or comprisable) in a network node such as a base station, a transceiver node, a central network node, or a cloud server node.

Alternatively or additionally, the apparatus may be configured to cause execution of (e.g., configured to execute) one or more of the method steps described in connection with any of the FIGS. 1 and 4. Features described in connection with any of FIGS. 1-4 may be equally applicable to the context of FIG. 5, and vice versa.

The apparatus of FIG. 5 is for controlling BWP allocation for a plurality of WCDs, wherein the WCDs are organized in one or more MIMO groups, wherein each MIMO group comprises WCDs with a current BWP allocation that falls within a BWP region associated with the MIMO group.

The example apparatus 510 comprises a controller (CNTR; e.g., controlling circuitry or a control module) 500.

The controller is configured to cause selection of one of the plurality of WCDs as a candidate WCD for MIMO group switch (compare with 110 and 410). To this end, the controller may comprise, or be otherwise associated with (e.g., be connected—or connectable—to), a WCD selector (e.g., WCD selecting circuitry or a WCD selection module) 501. The WCD selector may be configured to select one of the plurality of WCDs as a candidate WCD for MIMO group switch.

In some embodiments, the controller may be configured to cause the selection of the candidate WCD by causing determination of a first performance metric for each MIMO group, selection of a MIMO group with first performance metric that meets a first performance criterion, and selection of a WCD of the selected MIMO group as the candidate WCD. To this end, the controller and/or the WCD selector 501 may comprise, or be otherwise associated with (e.g., be connected—or connectable—to), a first performance metric determiner (e.g., first performance metric determining circuitry or a first performance metric determination module) 506 configured to determine the first performance metric for each MIMO group, a first performance criterion determiner (e.g., first performance criterion determining circuitry or a first performance criterion determination module) 507 configured to determine whether the first performance metric meets the first performance criterion, and a MIMO group selector (e.g., MIMO group selecting circuitry or a MIMO group selection module) 508 configured to select a MIMO group with first performance metric that meets a first performance criterion.

In some embodiments, the controller may be configured to cause the selection of a WCD of a selected MIMO group as the candidate WCD by causing determination of a second orthogonality metric for each WCD of the selected MIMO group, wherein the second orthogonality metric is in relation to other WCDs of the selected MIMO group, and selection of a WCD with second orthogonality metric that meets a second orthogonality criterion as the candidate WCD. To this end, the controller and/or the WCD selector 501 may comprise, or be otherwise associated with (e.g., be connected—or connectable—to), a second orthogonality metric determiner (e.g., second orthogonality metric determining circuitry or a second orthogonality metric determination module) 509 configured to determine the second orthogonality metric for each WCD of the selected MIMO group, and a second orthogonality criterion determiner (e.g., second orthogonality criterion determining circuitry or a second orthogonality criterion determination module) 510 configured to determine whether the second orthogonality metric meets the second orthogonality criterion.

The controller is also configured to cause determination of a first orthogonality metric between the candidate WCD and WCDs of a candidate MIMO group, wherein candidate WCD is not currently comprised in the candidate MIMO group. To this end, the controller may comprise, or be otherwise associated with (e.g., be connected—or connectable—to), a first metric determiner (e.g., first orthogonality metric determining circuitry or a first orthogonality metric determination module) 502. The first orthogonality metric determiner may be configured to determine the first orthogonality metric between the candidate WCD and WCDs of the candidate MIMO group.

In some embodiments, the controller may be configured to cause determination of a second performance metric for each MIMO group, and selection of a MIMO group with second performance metric that meets a second performance criterion as the candidate MIMO group. To this end, the controller may comprise, or be otherwise associated with (e.g., be connected—or connectable—to), a second performance metric determiner (e.g., second performance metric determining circuitry or a second performance metric determination module) 511 configured to determine the second performance metric for each MIMO group, a second performance criterion determiner (e.g., second performance criterion determining circuitry or a second performance criterion determination module) 512 configured to determine whether the second performance metric meets the second performance criterion, and a candidate MIMO group selector (e.g., candidate MIMO group selecting circuitry or a candidate MIMO group selection module) 513 configured to select a MIMO group with second performance metric that meets a second performance criterion as the candidate MIMO group.

The controller is also configured to cause determination of whether the first orthogonality metric meets a first orthogonality criterion. To this end, the controller may comprise, or be otherwise associated with (e.g., be connected—or connectable—to), a first orthogonality criterion determiner (e.g., first orthogonality criterion determining circuitry or a first orthogonality criterion determination module) 503. The first orthogonality criterion determiner may be configured to determine whether the first orthogonality metric meets the first orthogonality criterion.

The controller is also configured to cause (when the first orthogonality metric meets the first orthogonality criterion) updating of the BWP allocation for the candidate WCD—including BWP reconfiguration and/or BWP switching, as applicable—wherein the updated BWP allocation for the candidate WCD falls within the BWP region associated with the candidate MIMO group. To this end, the controller may comprise, or be otherwise associated with (e.g., be connected—or connectable—to), a BWP updater (e.g., BWP updating circuitry or a BWP update module) 504. The BWP updater may be configured to update the BWP allocation for the candidate WCD.

The controller is also configured to cause (when the first orthogonality metric meets the first orthogonality criterion) performance of a MIMO group switch of the candidate WCD from its current MIMO group to the candidate MIMO group. To this end, the controller may comprise, or be otherwise associated with (e.g., be connected—or connectable—to), a MIMO group switcher (e.g., MIMO group switching circuitry or a MIMO group switch module) 505. The MIMO group switcher may be configured to perform the MIMO group switch of the candidate WCD from its current MIMO group to the candidate MIMO group.

In some embodiments, the controller may be configured to cause scheduling and/or transmission in accordance with the allocated BWP(s) and the MIMO group organization. To this end, the controller may comprise, or be otherwise associated with (e.g., be connected—or connectable—to), a scheduler (e.g., scheduling circuitry or a scheduling module; not shown) and/or a transmitter (e.g., transmitting circuitry or a transmission module), illustrated in FIG. 5 as part of a transceiver TX/RX 530.

In some embodiments, the first and second orthogonality metric determiners is a single orthogonality metric determiner, and/or the first and second orthogonality criterion determiner is a single orthogonality criterion determiner.

In some embodiments, the first and second performance metric determiners is a single performance metric determiner, and/or the first and second performance criterion determiner is a single performance criterion determiner.

Figure 6:
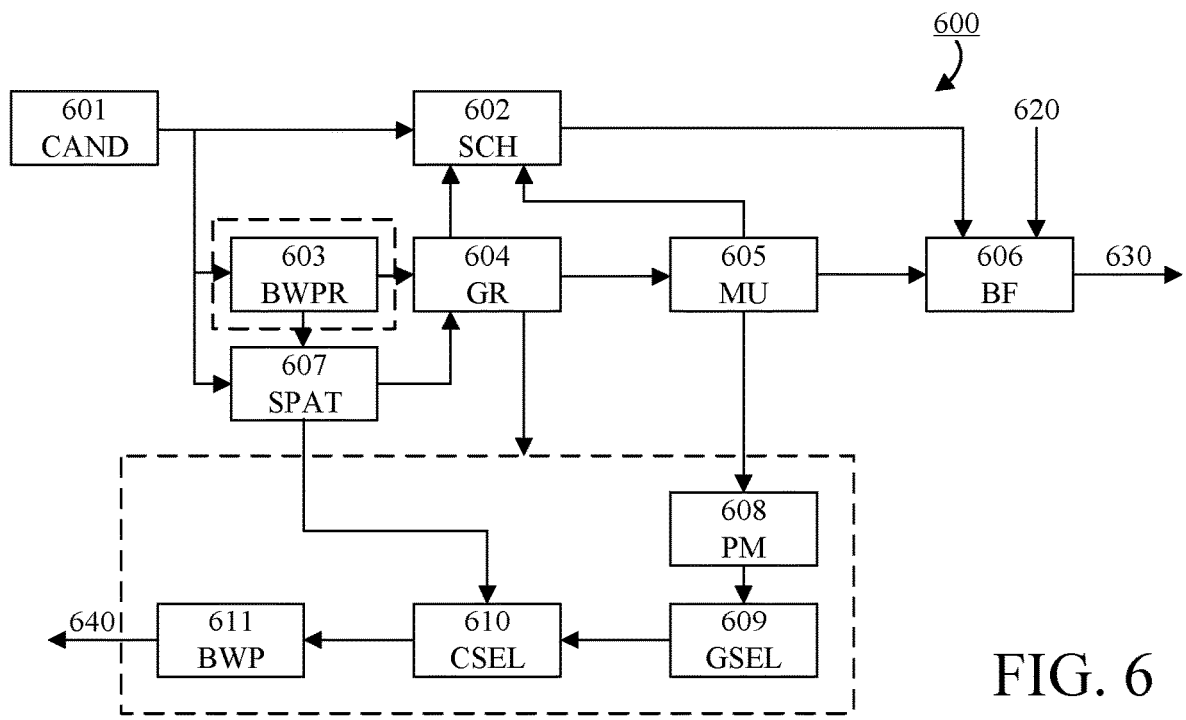
FIG. 6 is a schematic block diagram illustrating an example apparatus according to some embodiments.

FIG. 6 schematically illustrates an example apparatus architecture 600 according to some embodiments.

For example, the architecture 600 may be comprised (or comprisable) in the apparatus 510 and/or in a network node such as a base station, a transceiver node, a central network node, or a cloud server node.

Alternatively or additionally, the architecture 600 may be configured to cause execution of (e.g., configured to execute) one or more of the method steps described in connection with any of the FIGS. 1 and 4. Features described in connection with any of FIGS. 1-5 may be equally applicable to the context of FIG. 6, and vice versa.

A UE candidate block (CAND) 601 prepares a list of candidates UEs for scheduling. The list is input to a MU scheduling block (SCH) 602, a spatial property calculation block (SPAT) 607 and a BWP region block (BWPR) 603.

The BWP region block (BWPR) 603 determines and manages the BWP regions, and inputs related information to the spatial property calculation block (SPAT) 607 and to a MU grouping block (GR) 604.

The spatial property calculation block (SPAT) 607 calculates the orthogonality metric (e.g., first and/or second orthogonality metric; compare with 120, 414, 420), and inputs related information to the MU grouping block (GR) 604 and a candidate UE selection block (CSEL) 610.

The MU grouping block (GR) 604 groups UEs in MIMO groups based on orthogonality metric such that UEs that can be co-scheduled for transmission in the same time-frequency resource are in a same group (compare with 150, 450), and inputs related information to the MU scheduling block (SCH) 602 and a MU weight and SINR calculation block (MU) 605.

The MU weight and SINR calculation block (MU) 605 calculates the beamforming weights and SINR for each UE in a MIMO group, and inputs related information to the MU scheduling block (SCH) 602, a performance metric per group block (PM) 608 and a beamforming block (BF) 606.

The MU scheduling block (SCH) 602 performs the SU/MU-MIMO resource scheduling for UEs and provides corresponding information to the beamforming block (BF) 606.

The beamforming block (BF) 606 performs (e.g., downlink) beamforming for scheduled UEs, using data to be transmitted 620 and the beamforming weights for each UE, and provides the result 630 for transmission.

The performance metric per group block (PM) 608 calculates MIMO group performance metrics for the MIMO groups (compare with 411) and provides it to a MIMO group selector (GSEL) 609, which selects a group accordingly (compare with 412). The MIMO group selector (GSEL) 609 may also perform selection of candidate MIMO group(s) (compare with 416).

The candidate UE selection block (CSEL) 610 selects a candidate UE in the selected group from the MIMO group selector (GSEL) 609 based on a orthogonality metric (e.g., second orthogonality metric; compare with 110, 410, 413, 415). The candidate UE selection block (CSEL) 610 may also perform determination of whether the candidate UE can be included in a candidate MIMO group (compare with 130, 430).

A BWP selection block (BWP) 611 controls 640 updating of the BWP for the selected candidate UE (compare with 140, 440).

One or more of the blocks 608, 609, 610 and 611 may additionally use information pertaining to the MIMO groups provided from the MU grouping block (GR) 604.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a network node.

Embodiments may appear within an electronic apparatus (such as a network node) comprising arrangements, circuitry, and/or logic according to any of the embodiments described herein. Alternatively or additionally, an electronic apparatus (such as a network node) may be configured to perform methods according to any of the embodiments described herein.

Figure 7:
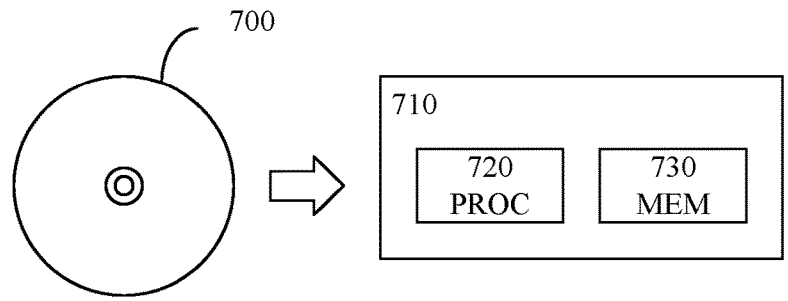
FIG. 7 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 7 illustrates an example computer readable medium in the form of a compact disc (CD) ROM 700. The computer readable medium has stored thereon a computer program comprising program instructions. The computer program is loadable into a data processor (PROC; e.g., data processing circuitry or a data processing unit) 720, which may, for example, be comprised in a network node 710. When loaded into the data processor, the computer program may be stored in a memory (MEM) 730 associated with or comprised in the data-processing unit. According to some embodiments, the computer program may, when loaded into and run by the data processing unit, cause execution of method steps according to, for example, any of the methods illustrated in FIG. 1, FIG. 4, or otherwise described herein.

Figure 8:
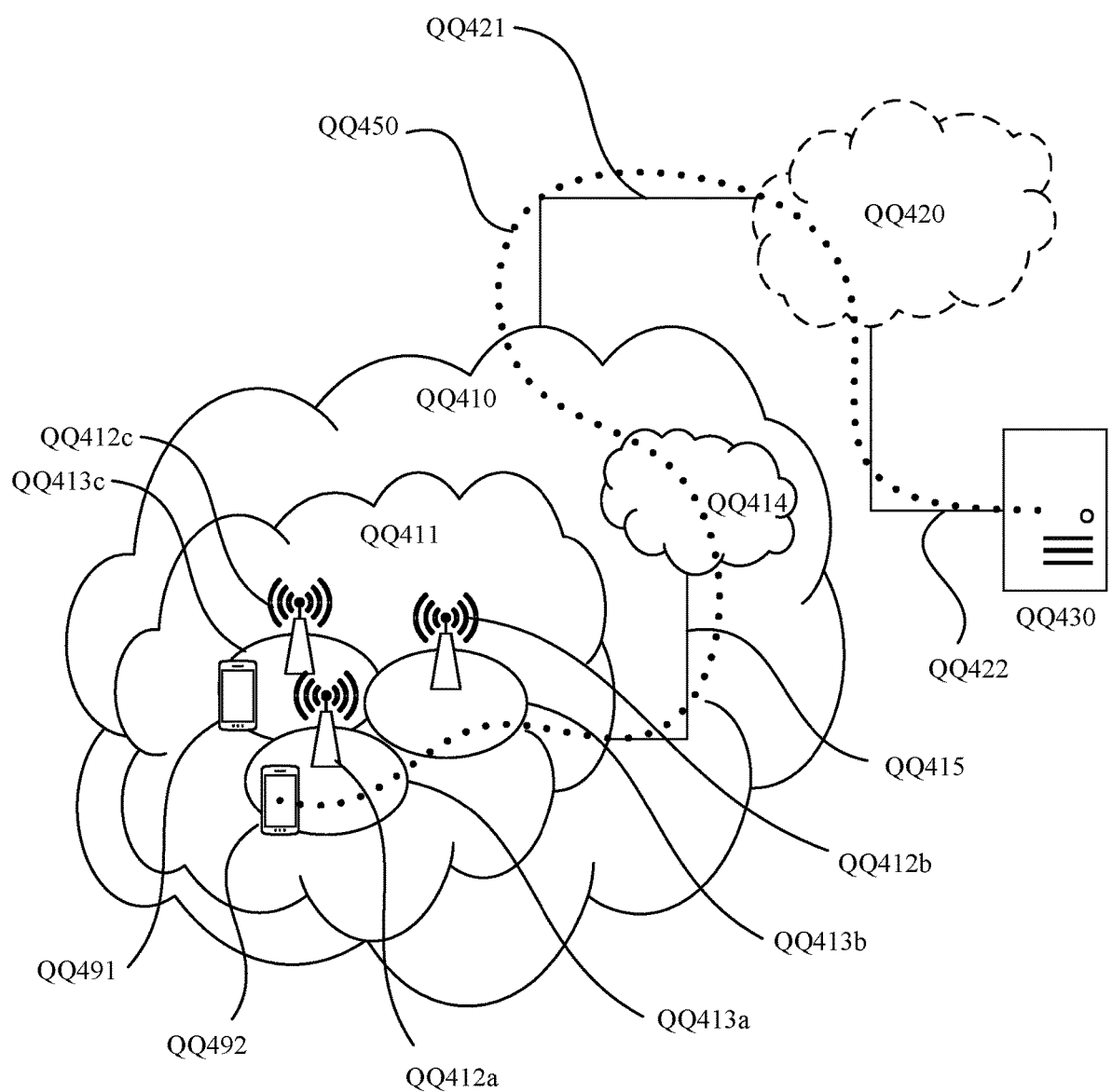
FIG. 8 illustrates a telecommunication network connected via an intermediate network to a host computer in accordance with some embodiments.

With reference to FIG. 8, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 8 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 9. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 9) served by base station QQ520. Communication interface QQ526 may be configured to facilitate connection QQ560 to host computer QQ510. Connection QQ560 may be direct or it may pass through a core network (not shown in FIG. 9) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 9:
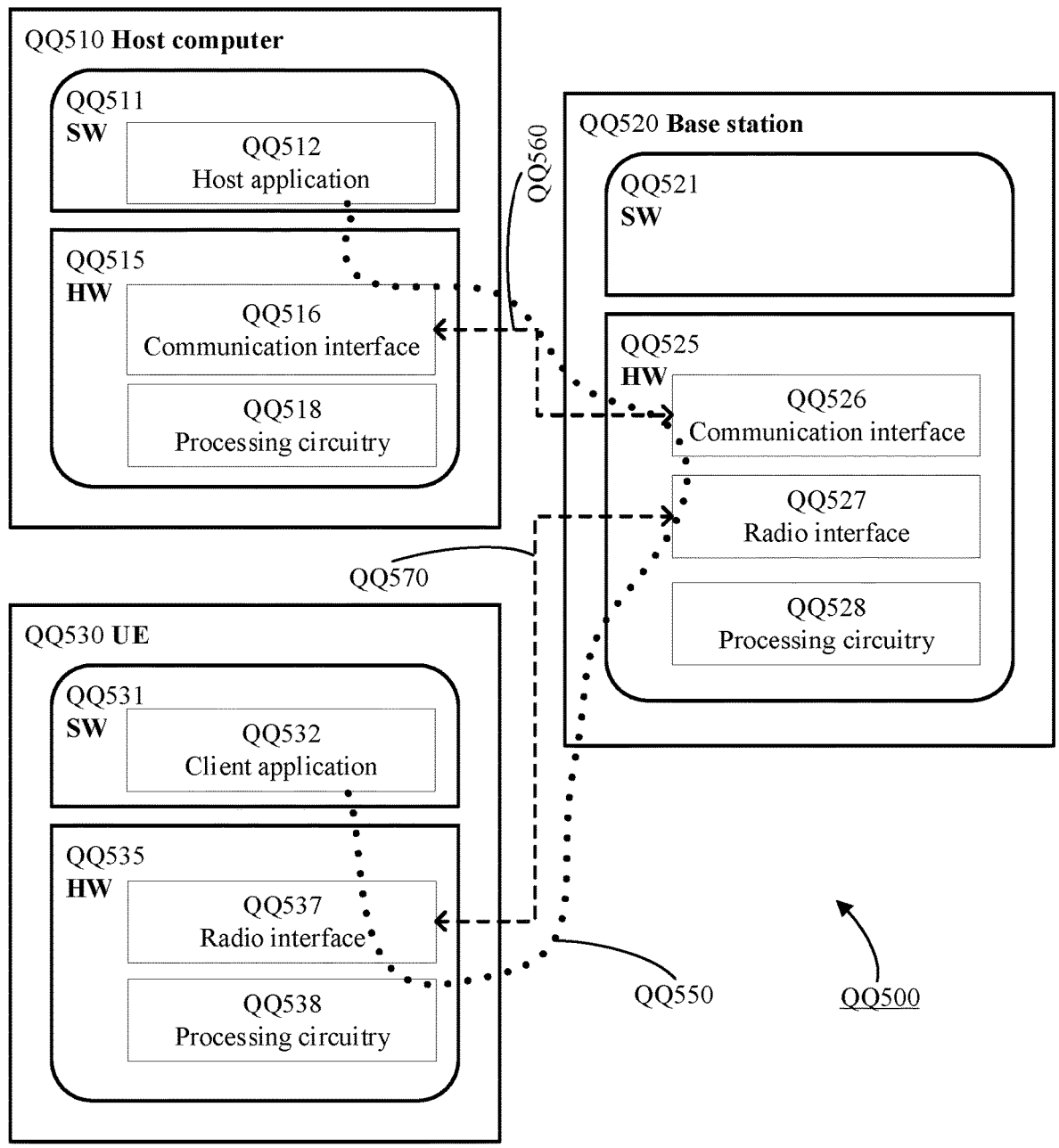
FIG. 9 illustrates a host computer communicating via a base station with a user equipment over a partially wireless connection in accordance with some embodiments.

It is noted that host computer QQ510, base station QQ520 and UE QQ530 illustrated in FIG. 9 may be similar or identical to host computer QQ430, one of base stations QQ412a, QQ412b, QQ412c and one of UEs QQ491, 00492 of FIG. 8, respectively. This is to say, the inner workings of these entities may be as shown in FIG. 9 and independently, the surrounding network topology may be that of FIG. 8.

In FIG. 9, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may provide approaches that enable accommodating the bandwidth part (BWP) concept in the context of multiple-input multiple-output (MIMO) communication, which may in turn improve one or more performance metrics (e.g., capacity, throughput, or the like).

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 10:
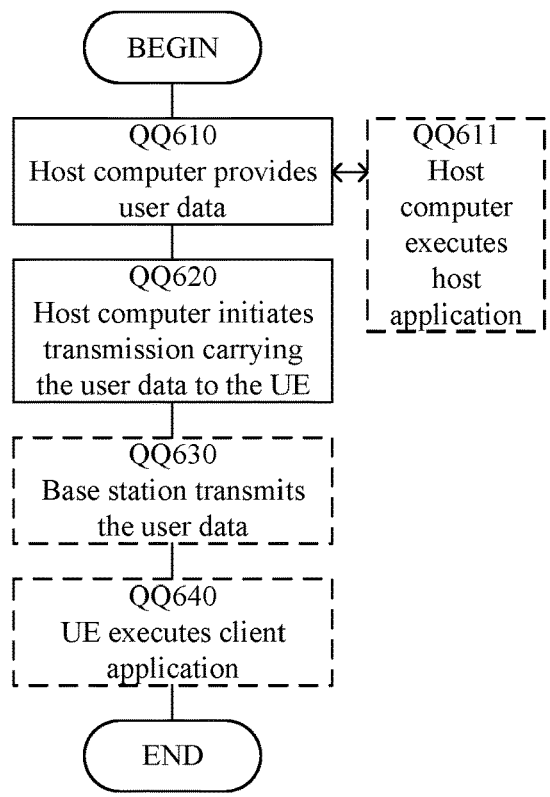
FIG. 10 is a flowchart illustrating example method steps implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 8 and 8. For simplicity of the present disclosure, only drawing references to FIG. 10 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 11:
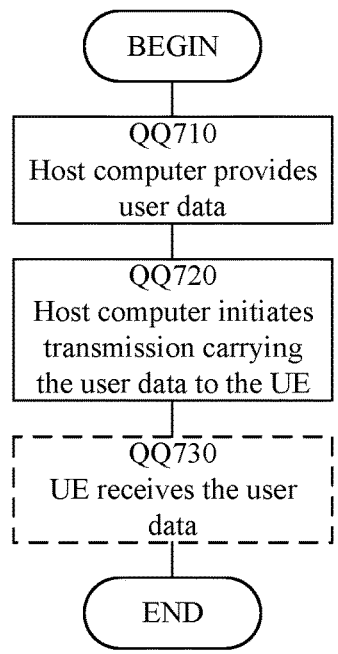
FIG. 11 is a flowchart illustrating example method steps implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 12:
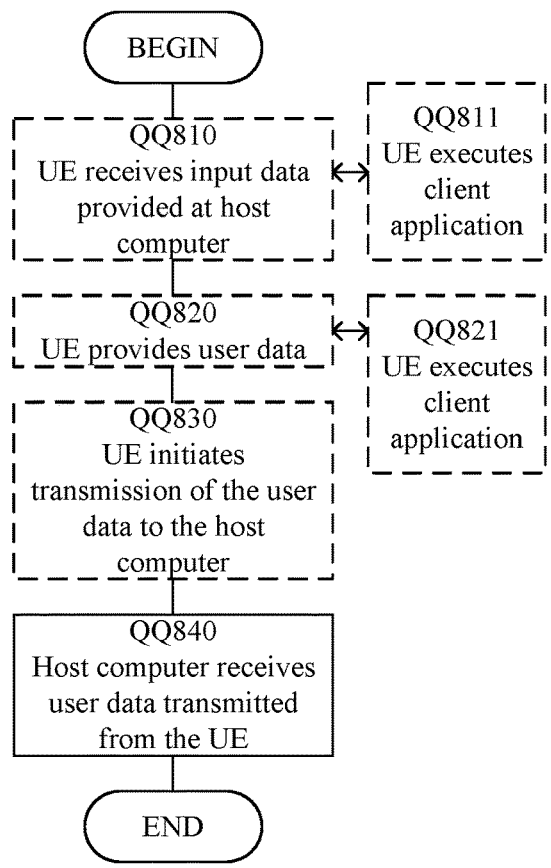
FIG. 12 is a flowchart illustrating example method steps implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 13:
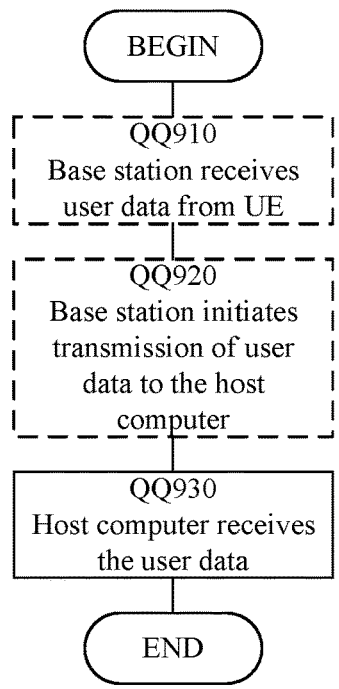
FIG. 13 is a flowchart illustrating example method steps implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

SOME EXAMPLE EMBODIMENTS

Group B Embodiments

B1. A method performed by a base station for controlling bandwidth part, BWP, allocation for a plurality of wireless communication devices, WCDs, wherein the WCDs are organized in one or more multiple-input multiple-output, MIMO, groups, wherein each MIMO group comprises WCDs with a current BWP allocation that falls within a BWP region associated with the MIMO group, the method comprising:
selecting one of the plurality of WCDs as a candidate WCD for MIMO group switch;
determining a first orthogonality metric between the candidate WCD and WCDs of a candidate MIMO group, wherein the candidate WCD is not currently comprised in the candidate MIMO group; and
when the first orthogonality metric meets a first orthogonality criterion:
updating the BWP allocation for the candidate WCD, wherein the updated BWP allocation for the candidate WCD falls within the BWP region associated with the candidate MIMO group; and
performing a MIMO group switch of the candidate WCD from its current MIMO group to the candidate MIMO group.

B2. The method of any of the previous embodiments in Group B, further comprising:
obtaining user data; and
forwarding the user data to a host computer or a wireless device.

Group C Embodiments

C1. A base station for controlling bandwidth part, BWP, allocation for a plurality of wireless communication devices, WCDs, wherein the WCDs are organized in one or more multiple-input multiple-output, MIMO, groups, wherein each MIMO group comprises WCDs with a current BWP allocation that falls within a BWP region associated with the MIMO group, the base station comprising:
processing circuitry configured to perform any of the steps of any of the Group B embodiments;
power supply circuitry configured to supply power to the base station.

Group D Embodiments

D1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps described for the Group B embodiments.

D2. The communication system of embodiment D1 further including the base station.

D3. The communication system of any of embodiments D1 through D2, further including the UE, wherein the UE is configured to communicate with the base station.

D4. The communication system of any of embodiments D1 through D3, wherein:
the processing circuitry of the host computer is configured to execute a host application, thereby providing the user data; and
the UE comprises processing circuitry configured to execute a client application associated with the host application.

D5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps described for the Group B embodiments.

D6. The method of embodiment D5, further comprising, at the base station, transmitting the user data.

D7. The method of any of embodiments D5 through D6, wherein the user data is provided at the host computer by executing a host application, the method further comprising, at the UE, executing a client application associated with the host application.

The invention claimed is:

1. A method for controlling bandwidth part (BWP) allocation for a plurality of wireless communication devices (WCDs), wherein the WCDs are organized in one or more multiple-input multiple-output (MIMO) groups, wherein each MIMO group comprises WCDs with a current BWP allocation that falls within a BWP region associated with the MIMO group, the method comprising:
selecting one of the plurality of WCDs as a candidate WCD for MIMO group switch;
determining a first orthogonality metric between the candidate WCD and WCDs of a candidate MIMO group, wherein the candidate WCD is not currently comprised in the candidate MIMO group; and
when the first orthogonality metric meets a first orthogonality criterion:
updating the BWP allocation for the candidate WCD, wherein the updated BWP allocation for the candidate WCD falls within the BWP region associated with the candidate MIMO group; and
performing a MIMO group switch of the candidate WCD from its current MIMO group to the candidate MIMO group.

2. The method of claim 1, wherein updating the BWP allocation for the candidate WCD comprises:
keeping the current BWP allocation for the candidate WCD when it falls within the BWP region associated with the candidate MIMO group; and
switching the BWP allocation for the candidate WCD when the current BWP allocation for the candidate WCD falls at least partly outside the BWP region associated with the candidate MIMO group.

3. The method of claim 2, wherein, when there is a BWP configured for the candidate WCD which falls within the BWP region associated with the candidate MIMO group, switching the BWP allocation for the candidate WCD comprises allocating such a BWP for the candidate WCD.

4. The method of claim 2, wherein switching the BWP allocation for the candidate WCD comprises, when there is no BWP configured for the candidate WCD which falls within the BWP region associated with the candidate MIMO group: performing BWP reconfiguration for the candidate WCD, and allocating a reconfigured BWP which falls within the BWP region associated with the candidate MIMO group for the candidate WCD; or
discarding the candidate MIMO group for inclusion of the candidate WCD.

5. The method of claim 1, wherein selecting one of the plurality of WCDs as the candidate WCD for MIMO group switch comprises:
determining a first performance metric for each MIMO group;
selecting a MIMO group with first performance metric that meets a first performance criterion; and
selecting a WCD of the selected MIMO group as the candidate WCD.

6. The method of claim 5, wherein selecting a WCD of the selected MIMO group as the candidate WCD comprises:
determining a second orthogonality metric for each WCD of the selected MIMO group, wherein the orthogonality metric is in relation to other WCDs of the selected MIMO group; and
selecting a WCD with second orthogonality metric that meets a second orthogonality criterion as the candidate WCD.

7. The method of claim 1, further comprising:
determining a second performance metric for each MIMO group; and
selecting a MIMO group with second performance metric that meets a second performance criterion as the candidate MIMO group.

8. A computer program product comprising a non-transitory computer readable storage medium storing a computer program comprising program instructions, the computer program being loadable into a data processing unit and configured to cause execution of the method of claim 1 when the computer program is run by the data processing unit.

9. An apparatus for controlling bandwidth part (BWP) allocation for a plurality of wireless communication devices (WCDs), wherein the WCDs are organized in one or more multiple-input multiple-output, (MIMO) groups, each MIMO group comprises WCDs with a current BWP allocation that falls within a BWP region associated with the MIMO group, the apparatus comprising:
controlling circuitry configured to:
select of one of the plurality of WCDs as a candidate WCD for MIMO group switch;
determine a first orthogonality metric between the candidate WCD and WCDs of a candidate MIMO group, wherein candidate WCD is not currently comprised in the candidate MIMO group; and
responsive to the first orthogonality metric meeting a first orthogonality criterion:
update the BWP allocation for the candidate WCD, wherein the updated BWP allocation for the candidate WCD falls within the BWP region associated with the candidate MIMO group; and
initiate a MIMO group switch of the candidate WCD from its current MIMO group to the candidate MIMO group.

10. The apparatus of claim 9, wherein the controlling circuitry is configured to:
update the BWP allocation for the candidate WCD by performing a process that comprises:
keeping of the current BWP allocation for the candidate WCD responsive to it falling within the BWP region associated with the candidate MIMO group; and
switching of the BWP allocation for the candidate WCD responsive to the current BWP allocation for the candidate WCD falling at least partly outside the BWP region associated with the candidate MIMO group.

11. The apparatus of claim 10, wherein the controlling circuitry is configured to cause switching of the BWP allocation for the candidate WCD by performing a process that includes, responsive to there being a BWP configured for the candidate WCD which falls within the BWP region associated with the candidate MIMO group, allocate such a BWP for the candidate WCD.

12. The apparatus of claim 10, wherein the controlling circuitry is configured to cause switching of the BWP allocation for the candidate WCD by performing a process that includes, responsive to there being no BWP configured for the candidate WCD which falls within the BWP region associated with the candidate MIMO group:
   initiating a BWP reconfiguration for the candidate WCD and allocating a reconfigured BWP which falls within the BWP region associated with the candidate MIMO group for the candidate WCD; or
   discarding of the candidate MIMO group for inclusion of the candidate WCD.

13. The apparatus of any of claim 9, wherein the controlling circuitry is configured to cause selection of one of the plurality of WCDs as the candidate WCD for MIMO group switch by performing a process that includes:
   determining a first performance metric for each MIMO group;
   selecting a MIMO group with first performance metric that meets a first performance criterion; and
   selecting a WCD of the selected MIMO group as the candidate WCD.

14. The apparatus of claim 13, wherein the controlling circuitry is configured to cause selection of a WCD of the selected MIMO group as the candidate WCD by performing a process that includes: determining a second orthogonality metric for each WCD of the selected MIMO group, wherein the orthogonality metric is in relation to other WCDs of the selected MIMO group; and
   selecting a WCD with second orthogonality metric that meets a second orthogonality criterion as the candidate WCD.

15. The apparatus of claim 9, wherein the controlling circuitry is further configured to:
   determine a second performance metric for each MIMO group; and
   select a MIMO group with second performance metric that meets a second performance criterion as the candidate MIMO group.

16. A network node comprising the apparatus of claim 9.

17. The network node of claim 16, wherein the network node is one of: a base station, a transceiver node, a central network node, or a cloud server node.

* * * * *